United States Patent [19]

Misaki et al.

[11] Patent Number: 4,765,996

[45] Date of Patent: Aug. 23, 1988

[54] ENRICHED RYE AND BARLEY AND ITS PRODUCTION

[75] Inventors: Masaru Misaki, Toyonaka; Hisashi Murata, Ikeda; Hideo Yamamoto, Osaka; Yasuhiko Watanabe, Kobe, all of Japan

[73] Assignee: Takeda Chemical Industries, Ltd., Osaka, Japan

[21] Appl. No.: 4,801

[22] Filed: Jan. 13, 1987

Related U.S. Application Data

[63] Continuation of Ser. No. 675,971, Nov. 28, 1984, abandoned.

[30] Foreign Application Priority Data

Nov. 30, 1983 [JP] Japan ................................ 58-227751

[51] Int. Cl.$^4$ ............................................... A23L 1/30
[52] U.S. Cl. .......................................... 426/72; 426/74; 426/99; 426/303; 426/307; 426/309; 426/630
[58] Field of Search ..................................... 426/98–99, 426/72, 73–74, 96, 618, 630, 303, 309, 307

[56] References Cited

U.S. PATENT DOCUMENTS

| | | | |
|---|---|---|---|
| 1,964,867 | 7/1954 | Allyn | 426/96 |
| 2,475,133 | 7/1949 | Furter | 426/309 |
| 2,508,477 | 5/1950 | Stievater et al. | 426/303 |
| 2,831,770 | 4/1958 | Antoshkiw | 426/303 X |
| 3,615,647 | 10/1971 | Kassens | 426/303 |
| 3,830,941 | 8/1974 | Luft et al. | 426/309 |
| 3,925,568 | 12/1975 | Rao et al. | 426/618 |

FOREIGN PATENT DOCUMENTS

| | | | |
|---|---|---|---|
| 9128 | 12/1955 | Japan . | |
| 131349 | 10/1981 | Japan . | |
| 531225 | 3/1941 | United Kingdom | 426/72 |
| 681930 | 10/1952 | United Kingdom | 426/72 |

*Primary Examiner*—R. B. Penland
*Attorney, Agent, or Firm*—Wenderoth, Lind & Ponack

[57] ABSTRACT

Polished rice or barley enriched with nutrients, wherein the nutrients are fixed in and on the grain by coating an oil/fat and/or a wax on the grains, coating the same with a hydrophilic emulsifier and further coating them with a starch-based coating agent. The enriched polished rice or barley has essential nutrients in good balance and quality-wise advantageous characteristics.

4 Claims, No Drawings

ENRICHED RYE AND BARLEY AND ITS PRODUCTION

This application is a continuation of now abandoned application Ser. No. 675,971 filed Nov. 28, 1984.

The present invention relates to enriched rice or barley containing nutrients in good balance and its production.

Cereal grains such as rice and barley are subjected to cleaning for marketing in polished form and they are generally washed with water before cooking. Most of the essential nutrients such as vitamins and minerals are lost in the polishing or washing process.

To overcome this disadvantage, vitamin $B_1$-enriched rice or barley, which is blended with the polished rice, has been marketed has contributed to the improvement of nutritional state. However, in the case that a balance of nutrition is considered, it is obviously of great importance to provide rice or barley enriched not only with vitamin $B_1$ but also with other nutrients in good balance.

As typical methods for producing enriched rice or barley, the so-called acid parboiled rice method and the coating method are known. The former method comprises immersing polished rice or barley in an acidic aqueous solution of enriching nutrients for a certain time period, then steaming the rice or barley in an atmosphere of superheated steam for a very brief time, and finally drying the grains in a hot current of air. In this method, however, rice or barley cannot be enriched with water-insoluble, fat-soluble vitamins such as vitamin A, vitamin D and vitamin E. Calcium, iron and minerals cannot be used for this purpose either, for the majority of the corresponding donor or precursor materials are insoluble or only sparingly soluble in water.

As for the coating method, there are many reports on the subject and the basic principle of the proposed processes comprises coating polished rice or barley with enriching nutrients and, for the purpose of preventing loss of these nutrients in washing such cereals to ready them for cooking, recoating the cereals with a solution of some water-insoluble film-forming material, for example zein, which is a constituent protein of Indian corn, or a natural resinous shellac secreted from the body surface of certain species of insects in such a solvent as ethanol, isopropyl alcohol or the like. The method enables one to produce an enriched polished rice or barley containing fat-soluble vitamins and minerals but the use of a solvent not only leads to an increased scale of the necessary production equipment but also entails a significantly increased cost of enriched polished rice or barley.

To overcome the above disadvantages, there was developed a process comprising incorporating or depositing nutrients on polished rice or barley grains, covering the coated grains further with an oil/fat and/or a wax, and finally covering the same with a starch. This process enabled one to enrich the cereal grains in an expedient manner and the resultant product has the advantage that the nutrients are not lost when the polished rice is washed with water prior to cooking. However, while polished cereals are sold generally after adding such enriched grains in a suitable proportion to ordinary polished rice, the starch coating of the above enriched cereal tends to be abraded off in this mixing process to expose the oil/fat and/or wax layer underneath, with the result that the free-flowing intergrain characteristic is adversely affected to cause non-uniformity of mixing, or the oil/fat and/or wax tends to stick to the mixer, feeder and other parts of the equipment. Furthermore, even when such a mixture of polished rice and enriched rice or barley is washed with water, the starch layer of the latter tends to be lost to expose the oil/fat and/or wax layer so that the affinity of the grains for water decreases, causing the grains to float and get lost along with the washings. Thus, the washing of such products has to be carried out with much care.

In view of the foregoing state of art, the present inventors conducted further research and found that all of the above disadvantages can be eliminated by coating polished rice or barley grains with an oil/fat and/or a wax, coating the so-treated grains with a hydrophilic emulsifier and finally coating the same with a coating agent based on a starch. The finding was followed by a further investigation which has resulted in the development of this invention.

Thus, object of this invention is to provide an polished enriched rice or barley of improved quality.

Another object of this invention is to provide a process for producing enriched polished rice or barley, which comprises incorporating or depositing nutrients in or on polished grains of rice or barley, coating each of the grains with an oil/fat and/or a wax which do not melt at ordinary temperature but melt on heating, coating the same with a hydrophilic emulsifier and further coating it with a starch-based coating agent. The term "oil/fat" means "oil and/or fat" which is a group of materials which are mainly composed of glyceride esters of fatty acids.

The polished rice or barley which can be used for the aforesaid enriching treatment according to this invention is virtually unlimited. For example, the variety, the degree of polishing and so on of such material cereals are optional. As to polished barley or the like, it may be a pressed barley obtainable by the conventional pressing process.

The nutrients used for enriching polished rice or barley according to this invention include, among others, water-soluble vitamins (vitamin $B_1$, vitamin $B_2$, vitamin C, vitamin $B_6$, nicotinic acid, pantothenic acid, etc.), fat-soluble vitamins (vitamin A, vitamin D, vitamin E, etc.), amino acids (lysine, threonine, etc.) and/or minerals (calcium, iron, etc.). Each of these nutrients can be selected from among the various compounds, extracts from natural products, purified preparations thereof, and so on which have been approved for addition to foodstuffs.

The oil/fat and/or wax used in accordance with this invention may be virtually of any kind only if they do not melt at ordinary temperature but melt on heating. Usually preferred are the oil/fat and/or wax having a melting point bf about 40° C. to 80° C.

For example, said oil includes such hydrogenated vegetable oils as hydrogenated soybean oil, cottonseed oil, rape seed oil, rice oil, corn oil, etc., animal fats such as beef tallow, lard, etc. and hydrogenated animal fats obtainable therefrom. The wax includes an animal or plant wax such as rice wax, carnauba wax, cane sugar wax, bees wax, sperm wax, etc.

The hydrophilic emulsifier used in accordance with this invention may be any of sucrose fatty acid esters, sorbitan fatty acid esters and glycerol fatty acid esters which have an HLB (hydrophilic-lipophilic balance) value of 8 or more, preferably 10 or more, proteins (for example, soybean protein, gelatin, sodium caseinate, etc.) or vegetable gum (for example, gum arabic, gum tragacanth, etc.).

As regards the starch used in accordance with the invention, there may be mentioned, for example, various starches such as corn starch, potato starch, wheat starch and rice starch and cereal flours such as wheat flour and rice flour. These are used in the raw form. Preferred is wheat starch having a particle diameter not more than $10\mu$, for the covering layer will then become dense and resistant against mechanical impacts.

The present method will now be described with reference to the case in which polished rice is used as an exemplary raw material and the same applies to polished barley.

The procedure for incorporating or depositing nutrients in or on polished rice grains may be a conventional one. When the nutrients are water-soluble, polished rice grains are first immersed in an acidic solution of the nutrients for a predetermined time, then steamed in a superheated water vapor for a very brief time and finally dried in a hot current of air. Alternatively, polished rice grains may be coated with such nutrients. Generally, however, better quality can be obtained by the former method, for the rice grains are gelatinized. In the case of water-insoluble or very sparingly water-soluble nutrients such as fat-soluble vitamins, minerals, etc., such nutrients are deposited, for instance by coating, on either polished rice grains as such or said rice grains having water-soluble nutrients deposited thereon and dried.

The coating process referred to above may be conducted in the conventional manner. By way of illustration, polished rice is put in a coating pan, and in a hot draft of air an aqueous solution containing the enriching nutrients and a binder such as sucrose, gelatin, gum arabic, α-starch and/or the like is sprayed over the rice.

The kinds and proportions of enriching nutrients can be selected as desired. For example, it is also good practice to add those nutrients which are lost in hulling and polishing so as to make up for the loss and recover the levels in unpolished or brown rice. The amount of nutrients is generally decided depending upon the ratio of the enriched grains to the ordinary grains (polished grains) to be blended. For example, in case that the enriched grains are blended with the ordinary grains in a ratio of 1:100 to 200, the nutrients are incorporated or deposited in or on polished grains in an amount as follows:

vitamin $B_1$: about 0.07 g to 0.3 g
vitamin $B_2$: about 0.003 g to 0.012 g
nicotinic acid: about 0.3 g to 1.2 g
pantothenic acid: about 0.1 g to 0.5 g
vitamin $B_6$: about 0.004 g to 0.02 g
vitamin E: about 0.07 g to 0.3 g
vitamin A: about 50000(I.U.) to 200000(I.U.)
vitamin D: about 20(I.U.) to 100(I.U.)
vitamin C: about 1 g to 5 g
calcium: about 0.4 g to 1.6 g
iron: about 0.06 g to 0.25 g
lysine: about 3 g to 15 g
(the amount is based on 100 g of finished enriched grains).

Considering the standard quantity required for fortification of the cereal grains, a larger amount than above makes it difficult to blend the enriched grains with the ordinary grains uniformly. On the other hand, a smaller amount is also not good, for it causes too much increase in the ratio of the enriched grains to the ordinary grains.

After incorporation or deposition of nutrients in or on polished rice grains, the grains are coated with an oil/fat and/or a wax which do not melt at ordinary temperature but do melt on heating. A typical coating procedure may comprise spraying the rice grains with a melt of said oil/fat and/or wax or with an emulsion prepared by emulsifying said oil/fat and wax with either an emulsifier such as sucrose fatty acid ester, glycerin fatty acid ester or sorbitan fatty acid ester or a natural mucilage such as soybean lecithin, gum arabic, gum xanthane, gelatin or agar.

Generally, the emulsion-coating procedure is more advantageous in terms of working efficiency, because it can be accomplished at ordinary temperature and ensures a more efficient deposition of oil/fat, etc. on the rice grains. To prepare such an emulsion, about 100 to 1000 weight parts of water and about 1 to 100 weight parts of said emulsifying agent are added to each 100 weight parts of oil/fat and/or wax and the mixture is emulsified in the conventional manner. The spray-coating can be preferably accomplished by spraying rice grains with said emulsion at about 20° to 70° C. in a coating pan with constant stirring and under a constant supply of warm air at about 40° to 100° C.

For the purpose of preventing the loss of nutrients in washing of rice, it is generally preferable to conduct the coating process in such a manner that the finished rice carries at least about 2 weight percent, preferably about 3 weight percent of oil/fat and/or wax. If rice grains are covered too thickly with the oil/fat and/or wax, the flavor and glutinousness of boiled rice tends to be adversely affected. To prevent this, it is generally desirable to ensure that the finished rice does not contain more than about 7 weight percent.

If the rice grains carrying the nutrients are previously coated with a starch before said coating with oil/fat and/or wax, the oil/fat and/or wax can be deposited more uniformly and intimately, thus giving a quality-wise more satisfactory product. In such cases, the starch is used in such a proportion that the finished rice will contain about 2 to 7 weight percent of starch.

It is generally preferable that before the subsequent coating with said hydrophilic emulsifier, the polished rice grains coated with said oil/fat and/or wax be polished to make the surfaces even, for such a treatment contributes to a decreased loss of the nutrients in the washing stage. This treatment can be advantageously accomplished by heating the grains to the softening temperature of the oil/fat and/or wax while a rotational force is applied to the grains to ensure a mutual contact of the grains in a rotary machine vessel.

The grains so treated are then covered with said hydrophilic emulsifier on top of the oil/fat and/or wax coat. A typical preferred coating technique comprises spray-coating the rice grains with an aqueous solution or aqueous suspension containing about 2 to 20 weight percent of the hydrophilic emulsifier in the routine manner.

The temperature of the rice grains for this coating process should be sufficiently low to prevent melting of the oil/fat and/or wax already deposited, and generally the coating amount of the hydrophilic emulsifier is preferably about 0.05 to 1 weight percent based on the finished product. An alternative process for coating the rice grains with said hydrophilic emulsifier comprises moistening the surface of the oil/fat and/or wax layer with water and dusting the hydrophilic emulsifier in powdery form on the surface.

Then, the hydrophilic emulsifier layer is further coated with a starch-based coating agent containing starch in an amount of more than 501%. Advantageously, this process can be carried out using the conventional coating equipment, for example by spraying the rice grains with an aqueous suspension containing a starch and a binder or dusting a starch over the grains while a binding agent is sprayed thereon. The binding agent may be one or more of such pastes as gelatin, gum arabic, locust bean gum, sodium alginate, etc., sugars such as sucrose etc., α-starch, dextrin and so on.

The temperature of the cereal grains for this starch coating stage should be sufficiently low to prevent melting of the oil/fat and/or wax already deposited, and the coating amount of starch is preferably about 2 to 25 weight percent based on the finished product. The amount of said binding agent is preferably about 0.2 to 45 weight percent relative to the starch.

The foregoing process gives the enriched polished rice according to this invention. Usually, the rice is further colored to make it more attractive. This coloration can be performed by adding a colorant such as vitamin $B_2$ or the like (e.g. chlorophyll, β-carotin, gardenia color) to the starch-based coating agent or spraying an aqueous solution of such colorant over the starch layer.

The enriched polished rice or barley product according to this invention, as produced by the steps of coating polished grains with a fat/oil and/or wax, coating the same with a hydrophilic emulsifier and further coating the same with a starch-based coating agent, has qualitywise very advantageous characteristics.

Thus, since the starch layer is disposed on a hydrophilic emulsifier layer in the method of this invention, the starch layer is stably maintained on the polished rice or barley grain so that the starch is not easily removed by an impact incidental to the mixing and transportation of the product or by washing with water. Therefore, the enriched rice has characteristics of fluidity similar to those of polished rice in the mixing and transport, permitting easy admixing. Moreover, when the product is washed with water, the good affinity of the grains for water does not cause the trouble of grains floating and being lost along with the washings. Furthermore, the loss of nutrients during washing is also minimized.

Moreover, unlike the prior art method using zein, shellac, etc., the present method does not involve use of an organic solvent in the coating stage so that the production equipment is less complicated or bulky and the cost of production is reduced. Furthermore, in the method according to this invention, enriched rice or barley is colored easily and stably to impart an improved appearance to the finished cereals.

The following experimental and working examples are further illustrative of this invention.

EXPERIMENTAL EXAMPLE 1

In a rotary coating pan, 2.0 kg of polished rice was immersed in 400 ml of a 1% aqueous acetic acid solution containing 3.0 g of vitamin $B_1$ hydrochloride at the solution temperature of about 35° C. for 2 hours, whereby the vitamin solution was thoroughly absorbed into the rice grains. The rice was then steamed in a water vapor at about 100° C. for about 2 minutes and, then, dried in a hot air current of about 70° C. for 1 hour. After completion of the drying, the grains were sieved to remove the agglomerated and crushed rice grains to give 1.95 kg of dried rice with a water content of 13.0%. This dried rice (1.95 kg) was put in a coating pan and spray-coated with 250 g of an aqueous suspension containing 11 g of natural vitamin E, 40 g of calcium carbonate and 10 g of gelatin. The rice was further spray-coated with 400 g of an emulsion containing 80 g of a mixture of hydrogenated cottonseed oil (m.p. about 70° C.) and rice wax (m.p. about 75° C.) (90:10), 8 g of sucrose fatty acid ester (HLB2) and 312 g of water to give about 2.0 kg of enriched polished rice containing vitamin $B_1$, vitamin E and calcium (Sample No. 1).

Using the enriched polished rice obtained according to the method used Sample No. 1, the following enriched polished rice products, Sample Nos. 2 through 4, were prepared.

SAMPLE NO. 2

Two (2) kg of the enriched polished rice obtained according to the method for preparation of Sample No. 1 was spray-coated with a solution of 4 g of sucrose fatty acid ester (HLB15) in 200 ml of water.

SAMPLE NO. 3

The enriched polished rice grains (2.0 kg) obtained by the method for preparation of Sample No. 1 were spray-coated with 300 g of an aqueous suspension containing 100 g of wheat starch, 40 g of sucrose, 6 g of gum arabic and 2 g of α-starch.

SAMPLE NO. 4

The enriched polished rice grains (2.0 kg) obtained by the method for Sample No. 2 were spray-coated with 300 g of an aqueous suspension containing 100 g of wheat starch, 40 g of sucrose, 60 g of gum arabic and 2 g of α-starch in accordance with the method for preparation of Sample No. 3.

The characteristic of fluidity and the number of grains that floated on the surface of water in washing were measured for each of the above Samples No. 1 through No. 4. The results are shown in Table 1.

TABLE 1

| Sample No. | Characteristics of fluidity | | The number of grains that floated on water-surface[*3] |
|---|---|---|---|
| | Angle of repose[*1] | Adhesivity[*2] | |
| 1 | 46° | 44° | 24 grains (19.5%) |
| 2 | 48° | 48° | 4 grains (3.2%) |
| 3 | 35° | 23° | 17 grains (13.8%) |
| 4 | 36° | 22° | 0.5 grains (0.4%) |

[*1]Each sample was dropped along a hopper positioned with its lip disposed at a height of 3 cm from a horizontal surface and the angle of repose formed was measured.
[*2]An iron plate carrying 10 g of each sample was gradually tipped and the angle of inclination of the iron plate at the time when all the grains had slid down was measured. The smaller the angle, the lower is the adhesivity of the sample.
[*3]123 Grains (equivalent to about 3 g) of each enriched rice sample were mixed with 600 g of polished rice and the number of grains of the enriched rice that floated off in washing was determined.

Each of the measured values given in Table 1 represented the mean result of 4 runs.

It will be apparent from the data of Table 1 that the enriched polished rice sample No. 4 according to this invention is very good in fluidity and that very few grains of the sample are lost in washing.

EXPERIMENTAL EXAMPLE 2

In a rotary coating pan, 2.0 kg of polished rice was immersed in 400 ml of a 1% aqueous acetic acid solution containing 3.0 g of vitamin $B_1$ hydrochloride at the solution temperature of about 35° C. for 2 hours, whereby the vitamin solution was thoroughly absorbed into the rice grains. The rice was then steamed in a water vapor at about 100° C. for about 2 minutes and finally dried in a hot air current of about 70° C. for 1 hour. After completion of the drying, the rice was sieved to remove bound and crushed grains to thereby give 1.97 kg of dried rice with a water content of 12.5%.

This dried rice (1.97 kg) was put in the coating pan, and sprayed with 250 g of an aqueous solution containing 11 g of natural vitamin E oil, 40 g of calcium carbonate and 10 g of gelatin. The rice was further sprayed with 400 g of an emulsion containing 76 g of hydrogenated cottonseed oil, 14 g of rice wax, 8 g of sucrose fatty acid ester and 312 g of water to give about 2.0 kg of yellow-colored polished rice enriched with vitamin $B_1$, vitamin E and calcium. Separately, enriched rice samples spray-coated with 100 g, 200 g and 300 g of said emulsion and a sample uncoated with the emulsion were also prepared in otherwise the same manner.

Each of the above samples (2.0 kg each) was spray-coated with a solution of 4 g of sucrose fatty acid ester (HLB15) in 200 ml of water and further spray-coated with 300 g of an aqueous suspension containing 100 g of wheat starch, 40 g of sucrose, 6 g of gum arabic and 2 g of α-starch to give an enriched polished rice.

300 g of polished rice was blended with 1.5 g of each of the above enriched polished rice samples and the blended rice was washed with water for cooking under predetermined conditions to determine the amounts of vitamin $B_1$, vitamin E and calcium in the washings.

Results

The percentage of the amount of vitamin $B_1$, vitamin E or calcium in the washings against the corresponding content in enriched polished rice is shown as the washing loss rate in Table 2.

TABLE 2

| No. | Total amount of hydrogenated cottonseed oil and rice wax (%)* | Washing loss rate (%) | | |
|---|---|---|---|---|
| | | Vitamin $B_1$ | Vitamin E | Calcium |
| 1 | 0 | 64 | 76 | 75 |
| 2 | 1.0 | 48 | 58 | 54 |
| 3 | 1.9 | 22 | 34 | 35 |
| 4 | 2.9 | 3 | 7 | 7 |
| 5 | 4.0 | 1 | 5 | 6 |

Note: Content in enriched polished rice

Table 2 clearly indicates that when the enriched polished rice samples coated with about 3 weight % or more of a mixture of hydrogenated cottonseed oil and rice wax (Nos. 4 and 5) were washed, the loss of nutrients was not more than 7%.

EXAMPLE 1

In a coating pan, 2 kg of rice was immersed in 400 ml of a 9% aqueous acetic acid solution containing 7.0 g of dibenzoylthiamine hydrochloride, 0.12 g of vitamin $B_2$, 13.5 g of nicotinamide, 6.6 g of calcium pantothenate and 0.2 g of pyridoxine hydrochloride at a bath temperature of about 35° C. for 2 hours. The immersed rice was taken out and steamed in a water vapor at about 100° C. for about 2 minutes and finally dried in a warm air current of about 70° C. for about 1 hour. Then, the rice was sieved to remove bound and crushed grains to thereby give 1.94 kg of dried rice with a water content of 12.6%. The rice was transferred to the coating pan, where it was spray-coated with 250 g of an aqueous suspension containing 10 g of natural vitamin E, 40 g of calcium carbonate and 10 g of gelatin. The rice was further spray-coated with 500 g of an emulsion containing 100 g of hydrogenated cottonseed oil, 5 g of rice wax, 10 g of sucrose fatty acid ester (HLB2) and 385 g of water. The above enriched polished rice was polished by tumbling it in a coating pan at an internal temperature of about 55° C. until the grains presented glossy surfaces.

Then, the rice was spray-coated with a solution of 2 g of sucrose fatty acid ester (HLB15) in 100 ml of water and further with 300 g of an aqueous suspension containing 100 g of wheat starch, 40 g of sugar, 4 g of α-starch and 0.2 g of vitamin $B_2$ to give about 2.1 kg of an enriched polished rice product containing 7 kinds of nutrients. One weight part of this enriched rice was mixed with 200 weight parts of polished rice and the mixture was washed. It was found that the enriched rice grains would not float and that the washing loss of each nutrient was approximately 5 percent.

EXAMPLE 2

In a coating pan, 2.0 kg of polished rice was spray-coated with 400 g of an aqueous suspension containing 3.0 g of vitamin $B_1$ hydrochloride, 2.0 g of vitamin A oil, 40 g of calcium carbonate and 20 g of gelatin. The rice was further spray-coated with 300 g of an emulsion containing 36 g of hydrogenated beef tallow (m.p. about 70° C.), 24 g of carnauba wax, 20 g of gum arabic, and 220 g of water. The above enriched polished rice was polished by tumbling it in a coating pan at an internal temperature of about 55° C. until the grains presented glossy surface.

Then, the rice was spray-coated with a solution of 18 g of isolated soy protein (Fujipro R, Fuji Oil Co., Ltd., Japan) in 300 ml of water and further spray-coated with 150 g of an aqueous suspension containing 50 g of rice starch, 20 g of sucrose, 5 g of gum arabic and 0.1 g of 10% β-carotin powder to give about 2.1 kg of an enriched polished rice product.

One weight part of this enriched rice was mixed with 200 weight parts of polished rice and the mixture was washed. It was found the enriched rice grains did not float and that when cooked in the routine manner, the rice was delicious.

In the same manner as above, the polished rice was coated with nutrients and further spray-coated with 200 g of an aqueous suspension containing 55 g of wheat starch, 25 g of sucrose and 2 g of α-starch to give about 2.1 kg of an enriched polished rice product.

EXAMPLE 3

In a coating pan, 2 kg of polished rice was immersed in 400 ml of a 9% aqueous solution of acetic acid containing 7.0 g of dibenzoylthiamine hydrochloride, 0.12 g of vitamin $B_2$, 13.5 g of nicotinamide, 6.6 g of calcium pantothenate and 0.2 g of pyridoxine hydrochloride at a solution temperature of 35° C. for 2 hours. The rice was then steamed at about 100° C. for about 2 minutes and finally dried in a warm air current of about 70° C. for about 1 hour. After drying, the rice was sieved to remove bound and crushed grains, giving about 1.97 kg of the dried rice with a water content of 13.0%. The dried rice was transferred to the coating pan, where it was spray-coated with 300 g of an aqueous suspension containing 10 g of natural vitamin E, 40 g of calcium carbonate, 10 g of ferric pyrophosphate, 10 g of gelatin and 10 g of sucrose. Then, the rice was spray-coated with 200 g of an aqueous suspension containing 60 g of wheat starch, 30 g of sucrose and 2 g of α-starch and further spray-coated with 60 g of bee's wax which is in the molten state at 90° C. Furthermore, the rice was spray-coated with a solution of 20 g of gum arabic in 100 ml of water, further spray-coated with 500 g of an aqueous suspension containing 200 g of corn starch, 80 g of sucrose and 10 g of α-starch, and finally spray-coated with 100 ml of an aqueous solution containing 0.1 g of vitamin $B_2$ and 1 g of a natural chlorophyll preparation, giving about 2.4 Kg of a yellow-green colored, enriched polished rice product having good fluidity.

EXAMPLE 4

In a coating pan, 1.0 kg of polished barley was spray-coated with 70 g of an aqueous suspension containing 1.5 g of vitamin $B_1$ hydrochloride, 20 g of calcium carbonate, 5 g of ferric pyrophosphate, 2 g of gum arabic and 6 g of sucrose. The barley was spray-coated with 300 g of an emulsion containing 60 g of hydrogenated repeseed oil (m.p. about 75° C.), 12 g of soybean lecithin and 228 ml of water, then spray-coated with a solution of 3 g of sorbitan fatty acid ester (HLB13) in 50 ml of water, and further spray-coated with 400 g of an aqueous suspension containing 150 g of confectionary rice flour, 50 g of lactose and 6 g of α-starch to give about 1.2 kg of enriched polished barley containing vitamin $B_1$, calcium and iron.

EXAMPLE 5

In a coating pan, 2 kg of rice was immersed in 400 ml of a 9% aqueous acetic acid solution containing 9.0 g of dibenzoylthiamine hydrochloride, 0.2 g of vitamin $B_2$, 15.0 g of nicotinamide, 9.0 g of calcium pantothenate and 2.0 g of pyridoxine hydrochloride at a bath temperature of about 35° C. for 2 hours. The immersed rice was taken out and steamed in a water vapor at about 100° C. for about 2 minutes and finally dried in a warm air current of about 70° C. for about 1 hour. Then, the rice was sieved to remove bound and crushed grains to thereby give 1.94 kg of dried rice with a water content of 12.6%. The rice was transferred to the coating pan, where it was spray-coated with 250 g of an aqueous suspension containing 13 g of natural vitamin E, 50 g of calcium carbonate, 10 g of sucrose and 10 g of α-starch. Then, this was spray-coated with 100 ml of an aqueous suspension containing 15 g of ferric pyrophosphate, 15 g of sucrose and 5 g of gum arabic. The rice was further spray-coated with 500 g of an emulsion containing 100 g of hydrogenated cottonseed oil, 5 g of rice wax, 10 g of sucrose fatty acid ester (HLB2) and 385 g of water. The above enriched polished rice was polished by tumbling it in a coating pan at an internal temperature of about 55° C. until the grains presented glossy surfaces.

Then, the rice was spray-coated with a solution of 2 g of sucrose fatty acid ester (HLB15) in 100 ml of water and further with 300 g of an aqueous suspension containing 100 g of wheat starch, 40 g of sugar, 4 g of α-starch and 0.1 g of vitamin $B_2$ to give about 2.1 kg of an enriched polished rice product containing 8 kinds of nutrients. One weight part of this enriched rice was mixed with 200 weight parts of polished rice and the mixture was washed. It was found that the enriched rice grains would not float and that the washing loss of each nutrient was approximately 5 percent.

What we claim is:

1. In a process for producing enriched polished rice or barley which consists essentially of incorporating or depositing an assortment of nutrients selected from the group consisting of water-soluble vitamins, fat-soluble vitamins, amino acids and minerals, in or on polished rice or barley grains, coating each of the grains with an oil/fat and/or a wax having a melting point of about 40° C. to 80° C., and coating the resultant grains with a starch coating agent containing starch and a binding agent wherein the starch is selected from the group consisting of corn starch, wheat starch and rice starch in raw form, the improvement wherein a hydrophilic emulsifier selected from the group consisting of sucrose fatty acid esters, sorbitan fatty acid esters and glycerol fatty acid esters which have an HLB value of 8 or more, proteins and vegetable gums, is coated on the grains in an amount of 0.05 to 1 weight percent based on the finished product, between the oil/fat and/or wax coating and the starch coating.

2. A process according to claim 1, wherein the oil/fat is hydrogenated cottonseed oil, the wax is rice wax, the hydrophilic emulsifier is sucrose fatty acid ester of HLB15 and the starch is wheat starch.

3. Enriched polished rice or barley which consists essentially of polished rice or barley grains, nutrients selected from the group consisting of water-soluble vitamins, fat-soluble vitamins, amino acids and minerals, fixed in or on said grains, a first coating layer of an oil/fat and/or a wax having a melting point of about 40° C. to 80° C., a second coating layer of hydrophilic emulsifier selected from the group consisting of sucrose fatty acid esters, sorbitan fatty acid esters and glycerol fatty acid esters which have an HLB value of 8 or more, proteins and vegetable gums, in an amount of 0.05 to 1 weight percent based on the finished product, and a third coating layer of a starch coating agent containing starch and a binding agent wherein the starch is selected from the group consisting of corn starch, wheat starch and rice starch in raw form, in that order.

4. The rice or barley enriched with nutrients according to claim 3, wherein the oil/fat is hydrogenated cottonseed oil, the wax is rice wax, the hydrophilic emulsifier is sucrose fatty acid ester of HLB15 and the starch is wheat starch.

* * * * *